United States Patent [19]

Moore, III et al.

[11] 3,967,059

[45] June 29, 1976

[54] BI-DIRECTIONAL LOGIC SYSTEM

[75] Inventors: Harry W. Moore, III, Dryden, N.Y.;
Richard R. McGee, Lakeland, Minn.

[73] Assignee: Sperry Rand Corporation, New York, N.Y.

[22] Filed: Feb. 5, 1975

[21] Appl. No.: 547,156

[52] U.S. Cl. .............................. 178/58 A; 328/97
[51] Int. Cl.² ............................................ H04L 5/16
[58] Field of Search ................. 178/58 A, 58 R, 59, 178/60; 343/176, 178; 307/239, 241; 328/92, 95, 97

[56] References Cited
UNITED STATES PATENTS

| | | |
|---|---|---|
| 3,571,512 | 3/1971 | Quiros ............................ 178/58 R |
| 3,581,006 | 5/1971 | Wallace ........................... 178/58 R |
| 3,769,525 | 10/1973 | Foss et al. ........................... 307/254 |
| 3,843,834 | 10/1974 | Burke ............................... 178/58 A |

*Primary Examiner*—Douglas W. Olms
*Attorney, Agent, or Firm*—John B. Sowell; Thomas J. Nikolai; Marshall M. Truex

[57] ABSTRACT

A fast acting bi-directional transmission system for use in the transfer of data from one location to another in either direction. When the transmitter at either end of the transmission line accepts the flow of data for transmission to the other end of the line, it automatically enables the transmission system, temporarily blocks the transmission of data from the other end of the transmission system and transmits data from the transmitting port to the receiving port.

6 Claims, 5 Drawing Figures

| A | B | C |
|---|---|---|
| L | L | H |
| L | H | L |
| H | L | L |
| H | H | L |

| A | B | C |
|---|---|---|
| L | L | H |
| L | H | H |
| H | L | H |
| H | H | L |

| A | B | C | D |
|---|---|---|---|
| L | L | L | H |
| L | L | H | H |
| L | H | L | H |
| L | H | H | H |
| H | L | L | H |
| H | L | H | H |
| H | H | L | L |

| A | B |
|---|---|
| H | L |
| L | H |

BI-DIRECTIONAL LOGIC SYSTEM

BACKGROUND OF THE INVENTION

1. Field of the Invention

The present invention relates to a bi-directional transfer system and more particularly to a fast acting direct couple bi-directional circuit for transfer of digital data or command levels from a transmitter to a receiver which requires a minimum number of components.

2. Description of the Prior Art

Bi-directional transmission systems which are capable of transferring digital data in two directions on the same line are known. A typical such prior art distribution system is disclosed in U.S. Pat. No. 3,488,634 of the type having a bi-stable device located at a central processor and another bi-stable device located at a console or a piece of external peripheral equipment. The two bi-stable devices are connected by a single bi-directional transmission line system. The bi-stable device at the processor end of the above-mentioned prior art system is embodied in the memory module employing read and write controls. The bi-stable device at the console or input-output device is of the type which usually employs a buffer register. Accordingly, the above-mentioned prior art system requires two write signals or two read signals in order to transfer a set condition from one end of the transmission line to the other.

In the prior art transmission systems it has been customary to use separate transmission lines to transfer data or control information in a single direction and to enable such lines at both the transmitting and receiving end. Prior art bi-directinal transmission line systems employed two sending gates and two receiving gates which were enabled by two read signals or two write signals. Prior art systems which require enabling lines and enabling pulses are relatively slow acting.

SUMMARY OF THE INVENTION

The present invention not only reduces the number of one-way transmission lines by a factor of two but also provides a bi-directional line arranged to transmit data or command levels as fast as the operation or direct coupled solid state devices employed in the circuit reasonably permit. The bi-directional transmission line of the present invention does not require enabling lines to enable the transmission direction of the bi-directional transmission system.

Accordingly, it is a general object of the present invention to provide a novel bi-directional transmission line system or circuit which may be implemented in the form of a single integrated solid state device.

It is the further object of the present invention to provide a bi-directional transmission system that permits direct coupling of data pulses or conditions without incurring signal attenuation.

It is yet another object of the present invention to provide a novel bi-directional transmission line system which is enabled by the data pulses or command levels originating at the transmitting end of the line and in which the data pulses or conditions from the transmission end of the line disables the latching-up of the system.

It is another object of the present invention to provide control means which can selectively enable or disable individual by-directional transmission lines to permit scanning or multiplexing operations.

These and other objects and features of the present invention will be presented in greater detail in the specification and the accompanying drawings which follow:

DESCRIPTION OF THE PREFERRED EMBODIMENT

Figures 1, 2A, 2B, 2C, 2D:
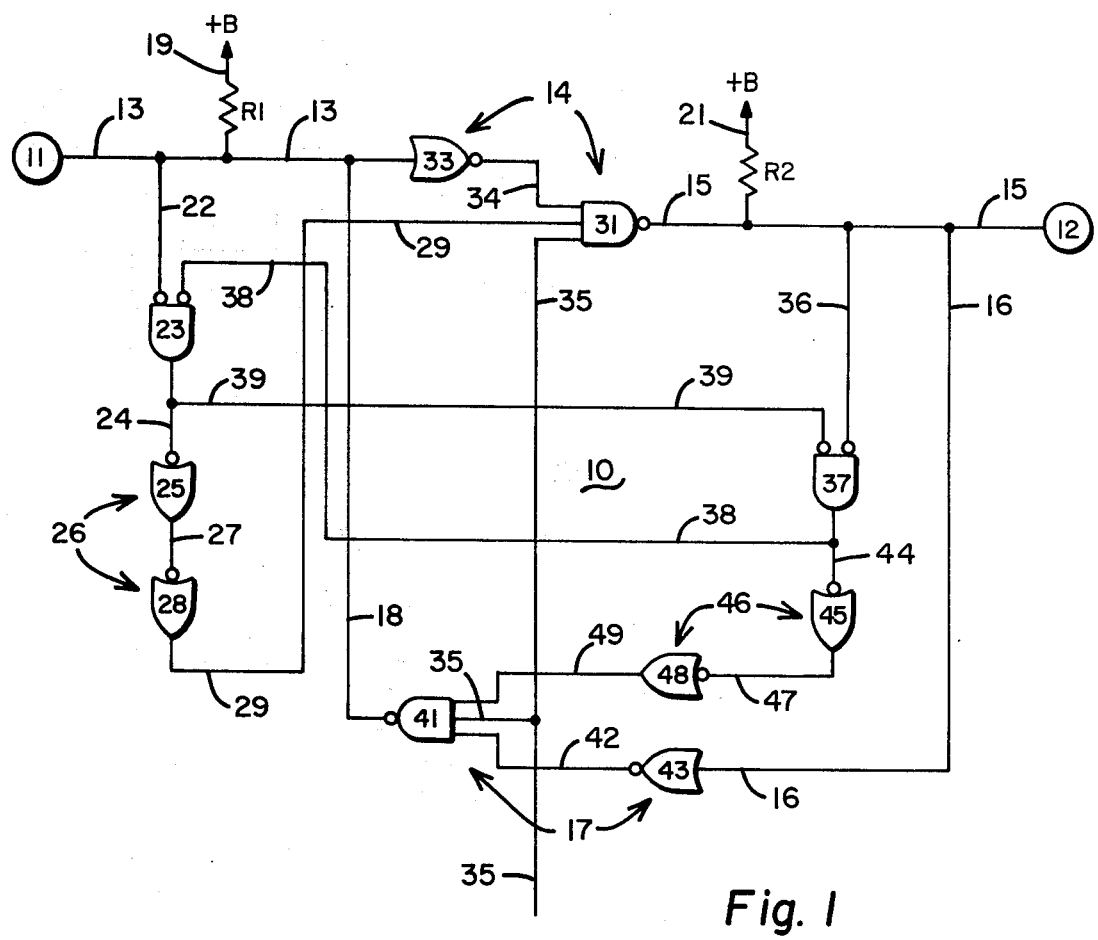
FIG. 1 is a logic block diagram showing the functional elements of a preferred embodiment of the present invention.
FIG. 2(A) is a truth table for a two input NOR gate.
FIG. 2(B) is a truth table for a two input NAND gate.
FIG. 2(C) is a truth table for a three positive input NAND gate.
FIG. 2(D) is a truth table for a simple inverter having positive or negative input.

The bi-directional data transmission system 10 shown in FIG. 1 is intended to be connected between any conventional digital data sending and receiving stations such as a channel of the central processing unit or any input-output peripheral equipment. The single bi-directional line system 10 can also be employed between two locations in the same piece of equipment such as the afore-mentioned central processing unit registers or registers and a piece of peripheral equipment. The bi-directional line system 10 can be employed to transmit either data pulses or commands.

The system 10 is preferably connected in an environment in which the transmitting and receiving stations are under program control so that the transmitting and receiving stations are informed or primed as to their receiving and transmitting functions. The system 10 is ideally suited for program cards of central processors which require interrogation or preset conditions.

The circuit comprising system 10 is symetrical and input-output ports 11 and 12 are both transmitting or receiving ports or stations for pulses or levels. Port 11 is directly coupled via line 13, drive means 14 and line 15 to port 12. Port 12 is directly coupled via lines 15, 16 drive means 17 and lines 18, 13 to port 11.

The transmission of data pulses from port 11 to port 12 or from port 12 to port 11 is only possible when data pulses are applied to system 10 while it is in the quiescent state. When data pulses are applied at either transmitting port 11 or 12, the receiving port 12 or 11 of the system 10 is automatically disabled, thus, preventing the latch-up of the system. Latch-up is a fault condition where a low level state at one or more ports has permanently locked the system into a low level state at the input and output ports.

Data pulses being applied through system 10 in either direction are applied as low pulse signals. The logic shown in FIG. 1 is particularly suited for implementation with TTL solid state devices which are known to be high-speed devices. At the present state of the art, standard input shotky gates normally switch or drive in about 3 nanoseconds, while high-speed TTL NAND gates require about 5 nanoseconds. Standard TTL NAND gates switch or drive in about 10 nanoseconds.

The operational levels of the preferred TTL devices shown in logical form are between 4 and 5 volts in the high state to about 0 and 4 volts in the low state. When power is applied at the plus B terminals 19, 21 and at the terminals (not shown) of the solid state devices, the system 10 will be in the quiescent state wherein terminals 19 and 21 are high, and lines 13 and 15 connected thereto by resistors R-1 and R-2 are also high. Resistors R-1 and R-2, when of the order of 5,000 ohms, will limit the current flow on lines 13 and 15 to about the order of 1 milliamphere.

In the quiescent state, port 11 and line 13 are high and line 22 to NOR gate 23 is also high, thus, gate 23 is off and output line 24 is low. Inverter 25 of delay means 26 is on, and output line 27 is high. Inverter 28 is off and output line 29 is low, thus, line 29 at the input of NAND gate 31 of drive means 14 is low and NAND gate 31 is off. The high quiescent state on line 13 is presented to inverter 33 of drive means 14, and the output on line 34 is low. Assuming for the purpose of this explanation that the condition on control line 35 is high and stays high as if NAND gate 31 was a two input NAND gate, then input lines 29 and 34 are both low in the quiescent state and the output of gate 31 on line 15 is high.

In the quiescent state, lines 15 and 36 are high, thus blocking NOR gate 37. The low output from two NOR gate 37, provided on line 38, is connected as a low or enabling input to two input NOR gate 23.

Data pulses applied at port 11 are in the form of low or negative data pulses which cause lines 13 and 22 to switch low. The original low data pulse signal on line 13 has been inverted in inverter 33 and applied via line 34 as an enabling signal to NAND gate 31 which serves as a signal driver or repeater. Since line 38 is normally low, the low pulses on line 22 enables the output 24 of NOR gate 23 to become high. This high signal is applied via line 39 to the input of negative input NOR gate 37 which blocks gate 37. The high data signal on line 24 is delayed in delay means 26 and emerges as a high data signal on line 29. The high data signal arriving on line 29 at NAND gate 31 finds gate 31 already enabled by line 34. The data signal pulse causes the output of NAND gate 31 to go low, thus, effectively directly coupling the delayed low data signal from transmitter port 11 to receiving port 12.

In the preferred embodiment of the invention described above, a specific implementation of the logic is shown. Other forms of gating circuits may be substituted to accomplish the logic functions described wherein data pulses being transmitted on the bi-directional transmission line system are employed to block the transmission of pulses from the receiver, enable the driver and are delayed and then directly coupled to the receiver.

Data pulses which are applied at the transmitting port 11 as low or negative state conditions will drive directly through NAND gate 31 and appear as low state conditions on line 15 at receiving port 12 after blocking gate 37 has been blocked and after being delayed in delay means 26 which comprises two inverters 25 and 28. Other forms of delay means may be employed so as to prevent a race condition which could lead to a latch-up condition. In the preferred embodiment shown, if both ports 11 and 12 attempt to transmit simultaneously, both blocking gates 23 and 37 are disabled. It will be understood that in the preferred embodiment the bi-directional transmission system is preferably under overriding program control which is attempting to send data from one port to the other at separated time intervals and simultaneous transmission from both ports is not a valid condition.

In the event the control line 35 is not to be utilized, it may be connected to a plus B voltage source through a dropping resister so that the drive gates 31 and 41 are enabled.

The transmission of data from transmitting port 12 to receiving port 11 is similar to the transmission of data from port 11 to port 12. Port 12 and port 11 are assumed to be at a normal high quiescent state and low data pulses are being applied on line 15 at port 12. Drive gate 41 is enabled by the high pulse on line 42 from inverter 43 driven by the low pulse on lines 15 and 16. The low data pulse on lines 15 and 36 pass through NOR gate 37 which is normally enabled by a low quiescent state condition on line 39. The high output from gate 37 on line 38 blocks gate 23. The high output on line 44 is applied to inverter 45 of delay means 46. The low ouput from inverter 45 on line 47 is applied to inverter 48, and the high output on line 49 is applied to NAND gate 41 which has already been enabled by the original low data pulse signal which is presented on line 42 as a high pulse. Thus, low data pulses applied at transmitting port 12 enable drive gate 41, block gate 23, are delayed in delay means 46 and are then directly coupled to receiving port 11 via drive means 17 and lines 18 and 13.

In modern data processing systems, a large number of lines are employed in series or parallel to set data in registers or other forms of memory. The present bi-directional transmission line system is provided with a control line 35 which may be employed to disable or partially enable both drive means 14 and 17 simultaneously.

When the novel bi-directional transmission line system is manufactured as a single module or solid state integrated circuit chip, it is simpler to manufacture the drive gates 31 and 41 as three positive input NAND gates with uncommitted inputs or collectors, thus, enabling the circuit to be used with control line 35 in a scanning or miltiplexing mode. Preferably, the collector of NAND gates 31 and 41 are uncommitted to permit direct connection to adjoining equipment which may have internal drivers at the interface.

When the novel bi-directional transmission line system is manufactured as an integrated circuit chip, the chips are preferably installed at the piece of equipment having the control line function closely available.

While delay means 26 and 46 have been shown employing two inverters, a single inverter or sufficient delay may be employed; however, if a single inverter is employed, drive gate 31 will become a NOR gate, and inverter 33 of drive means 14 is preferably connected at the output of drive gate 31 to provide the desired low output when low input data pulses are being transmitted.

In the foregoing explanation, the two states defined as low (negative) and high (positive) may be reversed by those skilled in the art to produce the logical or functional results required of the NAND gates and inverters which are expressed in the truth tables of FIGS. 2A to 2D.

The preferred embodiment of the invention has been described in a specific logic form. It is known that other forms of gating circuits may be substituted to accomplish the logic functions described or to accomplish the results achieved by direct transmission of data pulses from a transmitter to a receiver which are also self-enabling and self-blocking.

We claim:
1. A fast acting bi-directional data transmission system comprising:

a first input-output port having at least two stable states representative of a quiescent state and a transmitting or receiving state, a second input-output port having at least two stable states representative of a quiescent state and a transmitting or receiving state, first blocking means comprising first and second inputs and an output, said first input being coupled to said second input-output port for indicating its quiescent state or its data transmitting state, said second input being connected to said first input-output port for receiving data signals and for generating a first delayed data signal at said output when said first input is indicative of a quiescent state, second blocking gate means having first and second inputs and an output, said first input being coupled to said first input-output port for indicating its quiescent state or its data transmitting state, said second input being connected to said second input-output port for receiving data signals and for generating a second delayed data signal at said output when said first input is indicative of a quiescent state, first drive means comprising a first drive gate delay and a first drive gate, said first drive gate having a first input connected to the output of said first drive gate delay and a second input coupled to the output of said first blocking gate means for receiving said first delayed data signal, said output of said first drive gate being connected to said second input-output port, wherein, data signals simultaneously applied to said first blocking gate and said drive gate delay are transmitted from said first drive gate means to said second input-output port when said second input-output port is in its quiescent state, second drive means comprising a second drive gate delay and a second drive gate, said second drive gate having a first input connected to the output of said second drive gate delay and a second input coupled to the output of said second blocking gate means for receiving said second delayed data signal, said output of said second drive gate being connected to said first intput-output port, wherein, data signals simultaneously applied to said second blocking gate and said second drive gate delay are transmitted from said second drive gate means to said first input-output port when said first input-output port is in its quiescent state, whereby, data signals applied to a transmitting port at either end of said bi-directional transmission line first automatically enables the drive means connected thereto, then disables the transmission of data signals from other end of said bi-directional transmission line and then transmits data signals from the transmitting port to the receiving port.

2. A fast-acting bi-directional data transmission system as set forth in claim 1 which further includes delay means connected between the output of said blocking gate means and said second input to said drive gate coupled thereto.

3. A fast-acting bi-directional data transmission system as set forth in claim 1 wherein said drive gate means each comprise a three input NAND gate having an uncommitted input.

4. A fast-acting bi-directional data transmission system as set forth in claim 2 wherein said blocking gate means each consist of a two input NOR gate.

5. A fast-acting bi-directional transmission system as set forth in claim 2 wherein said delay means comprise a plurality of inverters.

6. A fast-acting bi-directional data transmission system as set forth in claim 3 which further includes a control line connected as an enabling input to the uncommitted input of said drive gate means for enabling one of a plurality of bi-directional data transmission systems.

* * * * *

UNITED STATES PATENT AND TRADEMARK OFFICE
CERTIFICATE OF CORRECTION

PATENT NO. : 3,967,059
DATED : June 29, 1976
INVENTOR(S) : Harry W. Moore, III, et al It is certified that error appears in the above-identified patent and that said Letters Patent are hereby corrected as shown below:

Claim 1, Column 5, Line 7, after "blocking" insert -- gate --.

Signed and Sealed this

Fourteenth Day of September 1976

[SEAL]

Attest:

RUTH C. MASON
Attesting Officer

C. MARSHALL DANN
Commissioner of Patents and Trademarks